United States Patent
Tago

[19]

[11] Patent Number: 5,864,829
[45] Date of Patent: Jan. 26, 1999

[54] NETWORK CHARGE METHOD AND SYSTEM

[75] Inventor: Shigeru Tago, Yokohama, Japan

[73] Assignee: Hitachi Software Engineering Co., Ltd., Yokohama, Japan

[21] Appl. No.: 712,555

[22] Filed: Sep. 13, 1996

[30] Foreign Application Priority Data

Sep. 14, 1995  [JP]  Japan .................................. 7-237090

[51] Int. Cl.$^6$ ............................ G06F 15/00; G06F 17/00; G06F 17/60
[52] U.S. Cl. ................................ 705/39; 705/26; 705/35; 705/41; 705/44; 380/23; 380/24; 380/25
[58] Field of Search ................................. 705/26, 35, 39, 705/41, 42, 44; 380/24

[56] References Cited

U.S. PATENT DOCUMENTS

| | | | |
|---|---|---|---|
| 3,652,795 | 3/1972 | Wolf et al. | 379/91.01 |
| 4,630,201 | 12/1986 | White | 705/44 |
| 4,641,239 | 2/1987 | Takesako | 705/41 |
| 4,709,137 | 11/1987 | Yoshida | 705/41 |
| 4,736,094 | 4/1988 | Yoshida | 705/41 |
| 4,755,940 | 7/1988 | Brachtl et al. | 705/44 |
| 4,823,264 | 4/1989 | Deming | 705/39 |
| 4,849,613 | 7/1989 | Eisele | 235/379 |
| 4,995,081 | 2/1991 | Leighton et al. | 380/23 |
| 5,036,461 | 7/1991 | Elliott et al. | 705/44 |
| 5,224,162 | 6/1993 | Okamoto et al. | 380/24 |
| 5,317,636 | 5/1994 | Vincaino | 380/23 |
| 5,440,634 | 8/1995 | Jones et al. | 380/24 |
| 5,475,585 | 12/1995 | Bush | 705/26 |
| 5,621,796 | 4/1997 | Davis et al. | 380/24 |
| 5,633,930 | 5/1997 | Davis et al. | 380/24 |
| 5,646,998 | 7/1997 | Stambler | 380/25 |
| 5,649,118 | 7/1997 | Carlisle et al. | 705/41 |
| 5,668,878 | 9/1997 | Brands | 380/30 |
| 5,704,046 | 12/1997 | Hogan | 705/39 |
| 5,717,868 | 2/1998 | James | 705/35 |
| 5,717,989 | 2/1998 | Tozzoli et al. | 705/37 |
| 5,732,400 | 3/1998 | Mandler et al. | 705/26 |
| 5,745,886 | 4/1998 | Rosen | 705/39 |
| 5,748,908 | 5/1998 | Yu | 235/376 |

*Primary Examiner*—Allen R. MacDonald
*Assistant Examiner*—James W. Myhre
*Attorney, Agent, or Firm*—Fay, Sharpe, Beall, Fagan, Minnich & McKee

[57] ABSTRACT

A user who offered the purchase of a commodity or performed down-loading through a network is charged by a safe method.

This charge is executed by sending a plurality of passwords, which can be used only once, to the commodity supplier from the user and by confirming all the passwords by both the supplier and the password maker.

6 Claims, 7 Drawing Sheets

FIG. 2

| 201 | 202 |
|---|---|
| ID0001 | J8EHB2JADC |
| ID0002 | 3EBQP29AG1 |
| ID0003 | 9O1BXCVE2E |
| ⋮ | ⋮ |

| 301 | 302 |
|---|---|
| ID0001 | AAABBBCCC |
| ID0002 | ABCABCABC |
| ID0003 | E1F2G3H4G |
| ⋮ | ⋮ |

| 401 | 402 | 403 | 404 |
|---|---|---|---|
| ID0003 | E1F2G3H4G | 320 | 500 |

FIG. 5

| 501 | 502 | 503 |
|---|---|---|
| ID0001 | E8EGH23EW | PJOC8CAMS |
|  | KABLMTHIR | EDOCNEUUE |
|  | GNILIF34C | LECXEDROW |
|  | ⋮ | ⋮ |
| ID0002 | TNUOMA9E8 | TENRETNID |
|  | EDUT8IN2M | LANOITANR |
|  | 9MUMIXA51 | SLLAWERIF |
|  | ⋮ | ⋮ |
| ID0003 | KNABEHTMO | EITTOCSEU |
|  | DLUOHSTAE | OGATUREGI |
|  | ⋮ | ⋮ |

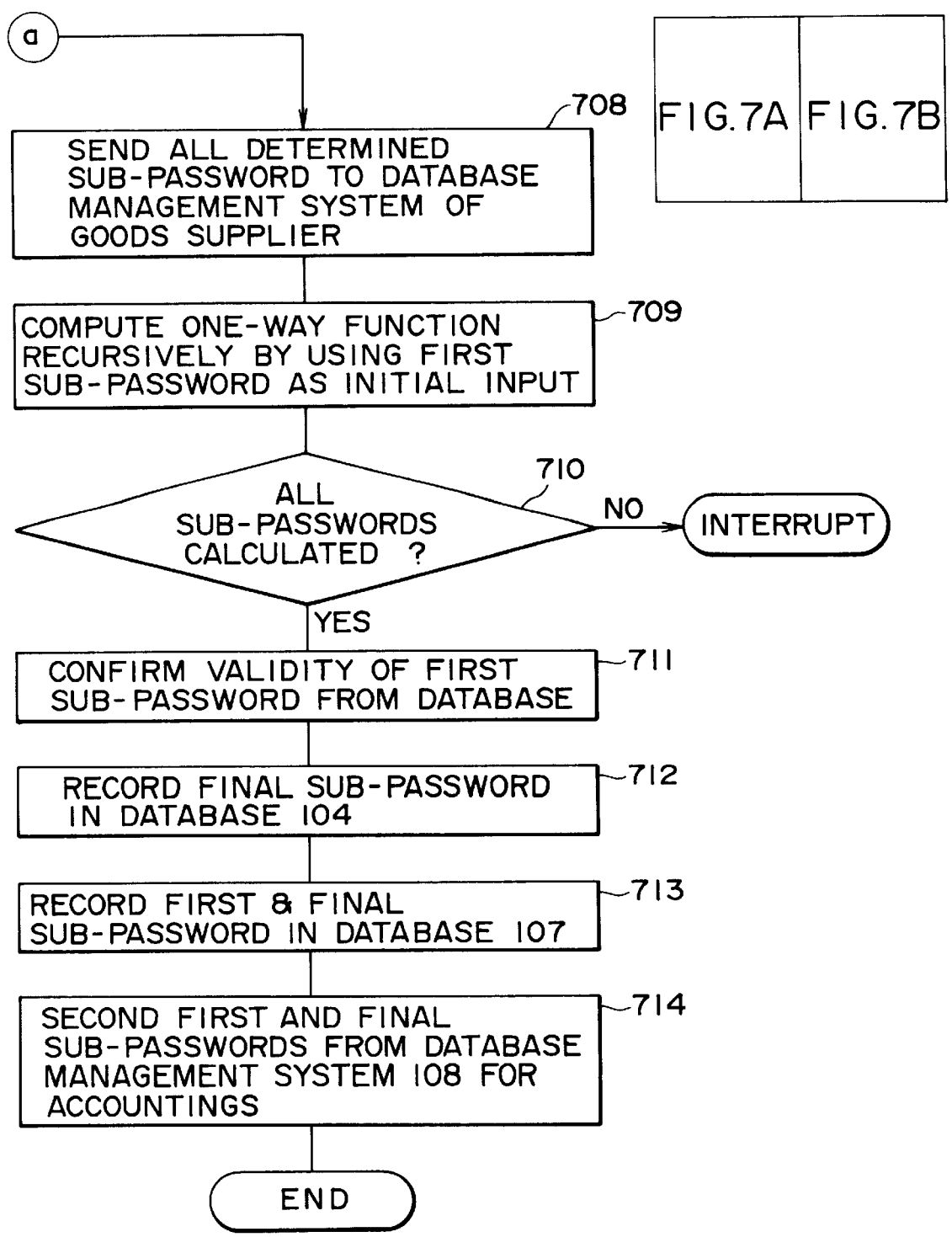

NETWORK CHARGE METHOD AND SYSTEM

BACKGROUND OF THE INVENTION

The present invention relates to a charge system having a function to charge a user when the purchase of the commodity is offered or down-loading is performed through a network and, more particularly, to a network charge method and system having an object to prevent the charge content from being tapped, altered and forged when the charge information is to be sent/received over the network.

As the charge system having the function to charge a user when the purchase of the commodity is offered or down-loading is performed through the network, there is the following system in the prior art.
1) The card number of a credit card, which the user has already registered as a member, is sent from the user to the commodity supplier through the network so that the supplier executes the charge by using the card number.
2) The public key cryptosystem is utilized for encrypting the credit card number and making an electronic sign for the charge.

In the system 1), however, when the card number of the credit card is to be sent, a third party might copy it for an illegal use, and the commodity supplier could forge (or illegal increase) the price.

These problems can be solved by encrypting the credit card number or making the electronic sign for the charge to prevent the card number or the price from being tapped or altered.

In the electronic sign system, however, the public key cryptosystem has to be used by all the users and the commodity suppliers, and elaborate designs have to be made for a method of distributing the public key data at the time of updating the keys of the users or a method for preventing the public key data of the users from being altered.

These designs are exemplified by the electronic signing of the public key data of the users, by using the key of a reliable organization. However, the information to be processed or exchanged as a whole is so complex that the actual running is frequently troubled.

Moreover, the secret keys of the users always have to be retained so that severe care has to be taken of the storage of the secret keys.

SUMMARY OF THE INVENTION

The present invention has the following objects:
1) to prevent a user from being illegally charged by a third party by tapping the content of the communications between the user and the commodity supplier;
2) to prevent the supplier from accessing the sum of the past charges on the user;
3) to prevent the supplier from illegally forging (or increasing) the sum of the prices to be charged on the user;
4) to prevent the user from illegally forging (or decreasing) the charged sum; and
5) to make it easy to store the data corresponding to the secret key of the user.

These objects are partially realized by the system of the prior art, but an object of the present invention is to provide a charge method capable of solving all these problems.

BRIEF DESCRIPTION OF THE DRAWINGS

FIG. 2 is a diagram showing a configuration of sub-password information to be stored in a password information database in the embodiment;

FIG. 3 is a diagram showing a configuration of master password information to be stored in a password information database in the embodiment;

FIG. 4 is a diagram showing a configuration of information to be stored in a magnetic card used in the embodiment;

FIG. 5 is a diagram showing a configuration of a sales database retained by a goods supplier in the embodiment;

FIGS. 7A, and 7B are flow charts showing another example of the accounting procedure.

DESCRIPTION OF THE PREFERRED EMBODIMENT

One embodiment of the present invention will be described with reference to the accompanying drawings.

Figure 1:
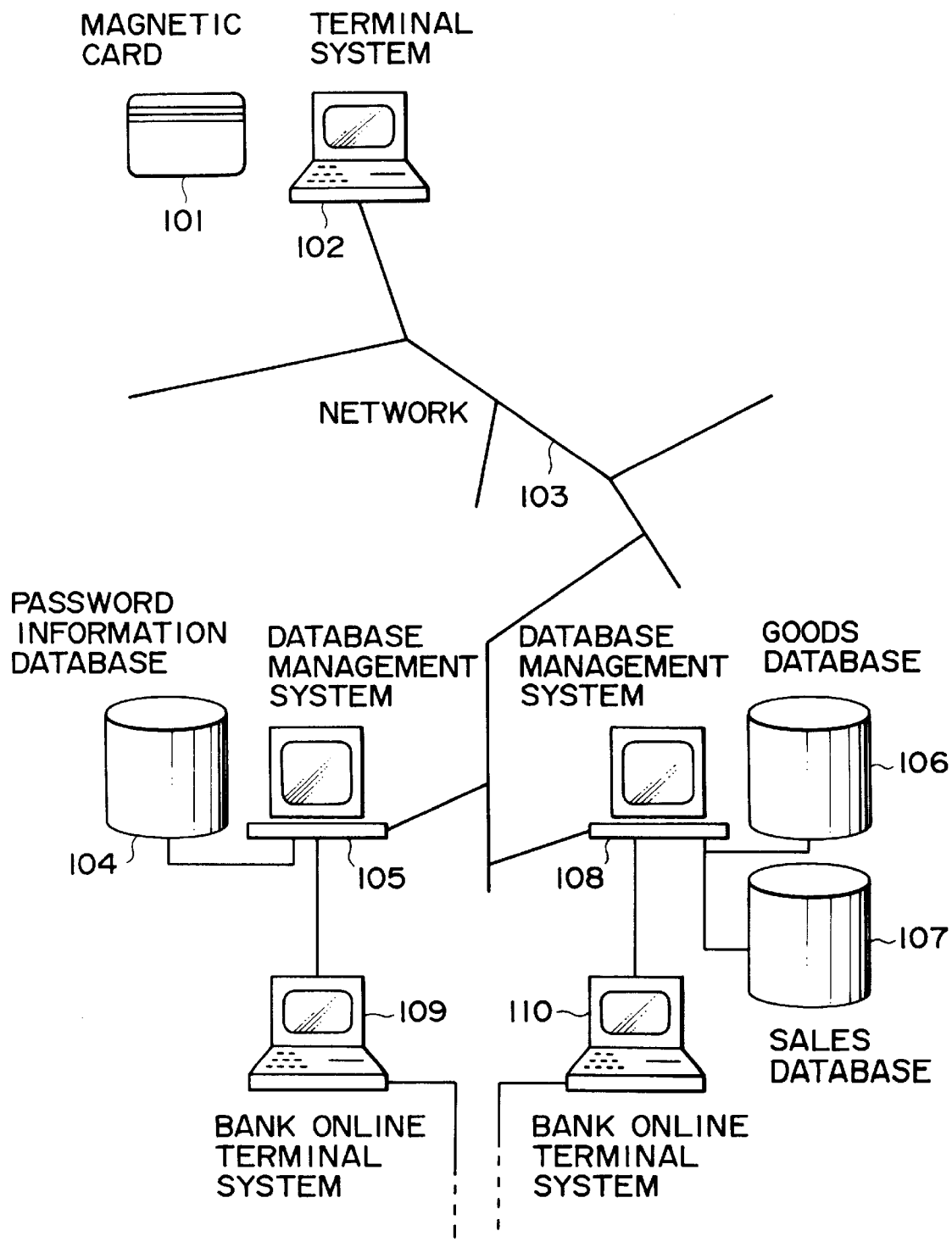
FIG. 1 is a diagram showing a system configuration according to one embodiment of the present invention.

FIG. 1 is a diagram showing a system configuration of the embodiment of the present invention.

In FIG. 1, reference numeral 101 designates a magnetic card which can be carried by a user to record/read data. This magnetic card 101 is exemplified by media such as a card having a magnetic stripe on its surface or a floppy disk. The magnetic card 101 can be further exemplified by an IC card having a buried IC chip.

Numeral 102 designates a terminal system which has functions to read/record data from and in the magnetic card 101, to send/receive data through the connected communication lines and to execute computations.

Numeral 103 designates a network which is composed of one or more communication lines to transfer the data.

Numeral 104 designates a password information database for storing the sub-passwords which are calculated by a one-way function.

Numeral 105 designates a database management system which has functions to read/record data from and in the password information database 104 and to send/receive the data through the connected communication lines.

Numeral 106 designates a goods database for storing the prices and identifiers of goods to be sold by the supplier and for storing the goods data if the goods themselves are the "data" to be down loaded by the user through the network 103.

Numeral 107 designates a sales database for storing a list of the sub-passwords used by the user to purchase the goods and the identifier of the corresponding card 101.

Numeral 108 designates a database management system having functions to read/record data from and in the goods database 106 and the sales database 107 and to send/receive the data through the connected communication lines.

Numerals 109 and 110 designate bank online terminal systems which are connected with the database management systems 105 and 108 and given functions to read the data of the databases 104, 106 and 107 through the database management systems 105 and 108 and to move (or transfer) the deposits between the accounts through the deposit systems of banks.

FIG. 2 shows a configuration of a sub-password stored in the password information database 104 and corresponding to each magnetic card 101. The sub-password is constructed of an identifier 201 and a sub-password information 202.

The identifier 201 is one for uniquely identifying the magnetic card 101 carried by each user and is assigned by the database management system 105 at the card making time.

The sub-password information 202 corresponds to the output result which is achieved by calculating a one-way function recursively a plurality of times by using the master password corresponding to each magnetic card 101 as the initial input information.

In this case, the frequency of the recursive calculations is determined depending upon the use counts and the maximum usable counts of each magnetic card 101. At the magnetic card making time, the maximum usable counts are recursively computed so that they are recorded in the magnetic card 101 and recorded as the sub-password information 202 in the password information database 104.

FIG. 3 shows a configuration of a master-password corresponding to each magnetic card 101, as stored in the password information database 104. This master password is constructed of an identifier 301 for identifying each magnetic card 101 uniquely, and master password information 302 assigned to each magnetic card 101.

FIG. 4 shows a configuration of the inherent information of each magnetic card, as stored in the magnetic card 101. This inherent information is constructed of: an identifier 401 for identifying each magnetic card 101 uniquely; a master password 402 assigned to each magnetic card 101; a numerical value 403 indicating the counts at which the magnetic card 101 was used; and a numerical value 404 indicating the maximum usable counts of the magnetic card 101.

In the example of FIG. 4, the magnetic card 101 having the identifier="ID0003" is recorded with the master password="E1F2G3H4G", the numerical value of past use counts "320", and the numerical value of the maximum usable counts="500".

Of these, the identifier="ID0003" is identical to the identifier 203 of FIG. 2 and the identifier 303 of FIG. 3, and the master password="E1F2G3H4G" is identical to the master password information of FIG. 3.

FIG. 5 shows a list of the sub-password information which is stored in the sales database 107 and utilized in the past by the user for purchasing the goods. The sub-password information is constructed of an identifier 501 for identifying each magnetic card 101 uniquely, and sub-passwords 502 and 503 which were received when the goods were purchased in the past by utilizing the magnetic card 101 of the identifier 501.

Here, the sub-password 502 is one which was received first at the time of purchasing a commodity, and the sub-password 503 is one which was received last at the time of purchasing a commodity.

It is indicated, for example, that when the user having the magnetic card 101 of the identifier 501=ID0001 purchased the first commodity, he or she received the sub-password 502 of "E8EGH23EW" at first and the sub-password 503 of "PJOC8CAMS" at last.

FIGS. 6, 6A, 6B and 7, 7A, 7B present flow charts showing the processing flows of the present embodiment.

The detail of the present embodiment will be described in the following in accordance with the flow charts.

The present system is started when the user decides to purchase a commodity and offers or down-loads, and one cycle is ended when the charge is paid to the supplier.

First of all, the user inserts his magnetic card 101 into the terminal system 102 (at Step 601).

Here, the information of FIG. 4 has already been stored in the magnetic card 101. The initialization of the information of FIG. 4 is executed at the card purchasing time. If this magnetic card 101 is used first, there is stored as the numerical value 403 a numerical value equal to the numerical value 404 of the maximum usable counts. Moreover, the password information 202, as initially stored in the password information database 104, is equal to that which is transformed from the numerical value 403 in the initial state by a one-way function.

Next, in the terminal system 102, the numerical value 403 of the past use counts and the numerical value 404 of the maximum usable counts are read out from the card 101, and a numerical value smaller by the numerical value 403 of the past use counts than the numerical value 404 of the maximum usable counts is calculated (at Step 602).

This is the numerical value indicating the remainder of the usable counts of the magnetic card 101.

Next, in the terminal system 102, the master password 402 is initially inputted to compute the one-way function recursively a predetermined number of times (at Step 603).

Specifically, the value, as transformed from the master password 402 by the one-way function, is transformed again by the same one-way function. These operations are then repeated by the same function to determine the final value (i.e., the sub-password). The number of repetitions is equalized to the numerical value which is determined at Step 602.

As a result, there are generated a plurality of sub-passwords which are valid only one time.

Next, the value determined at Step 603, i.e., the sub-password is sent through the network 103 from the terminal system 102 to the database management system 108 (at Step 604).

Next, it is confirmed (at Step 605) whether or not the sub-password received by the database management system 108 is unused.

Specifically, the database management system 108 reads out the content of the sub-password information database 104 through the database management system 105 to obtain the sub-password information 202 corresponding to the identifier 201 of the magnetic card 101. The database management system 108 further computes the one-way function only once by using the received sub-password as its input information, and confirms that the result coincides with the sub-password information 202. If the coincidence is not obtained, the database management system 108 informs the user of the noncoincidence, and ends the processing.

If it is confirmed at Step 605 that the received sub-password has not been used, the database management system 108 replaces the sub-password by the sub-password information 202 of the database 104 through the database management system 105 (at Step 606).

Next, the sub-password is stored as the password 502 or 503 in the sales database 107 (at Step 607).

If the sub-password is one which was calculated first on the terminal system 102, it is stored as the password 502 and otherwise as the password 503.

Next, the terminal system 102 increments the numerical value 403 of the past use counts by "1" (at Step 608). In this case, the numerical value 403 of the use counts is semantically incremented by "1" but logically decremented by "1".

Next, the terminal system 102 reads the price of the corresponding commodity from the goods database 106 through the network 103 and determines the use counts of the card corresponding to the price, to confirm whether or not that value is equal to the number of sub-passwords sent to the database management system 108 (at Step 609).

The equality implies that the sub-password corresponding to the price has been sent, and the operation of sending the sub-password is ended.

The inequality implies that the number of sub-passwords to be sent from the user is short, and the processing is returned to Step 602. These operations are repeated till the sub-passwords corresponding in number to the price is sent to the database management system 108.

Next, it is confirmed (at Step 610) whether or not the numerical value 403 of the past use counts exceeds the numerical value 404 of the maximum usable counts. If this answer is YES, the magnetic card cannot be used any more, and the processing is interrupted.

As a result of this interruption, the dealings of purchasing the commodity, as offered by the user, is canceled.

If, on the other hand, the database management system 108 receives the sub-passwords corresponding in number to the price from the user, it sends all the sub-passwords to the database management system 105. After having confirmed that all the sub-passwords can be calculated by the one-way function from the master password information 302, the database management system 108 requests the bank online terminal system 109 or 110 for the transfer of the charge corresponding to the price (at Step 611). As a result, the charge for the price is paid to the commodity supplier.

Thus, by using one of the sub-passwords or the disposable passwords as the conversion unit, the sub-passwords corresponding in number to the price are generated in the terminal unit 102. These sub-passwords are stored in the sales database 107 after it was confirmed that they are not used. All these sub-passwords are sent to the bank online terminal systems 109 and 110 to request the transfer of the price. As a result, the following effects can be attained.

1) Since the identical sub-passwords are not repeatedly used as those corresponding in number to the price to be sent from the user to the goods supplier, the user could not be illegally charged even if the content of communications between the user and the supplier could be tapped and copied.
2) The sub-passwords to be sent from the user to the supplier contain neither the value of the sum of charges received in the past by the user nor the past use counts of the master passwords, the supplier cannot access the sum of the past charges upon the user. Moreover, the database is not recorded with the use counts of the master password of the user so that any third party cannot access the sum of the past charges on the user unless the master password is not illegally copied.
3) The user cannot calculate the unused sub-passwords by using any of the sub-passwords that were sent for any goods by the user, so that the supplier cannot change (or increase) the sum of the charges on the user, namely, make the unused sub-passwords into the used ones.
4) Since the sub-password used by the user is recorded in the database, the sum of charges cannot be forged (or decreased) by illegally using the once-used sub-password doubly.
5) By computing and recording a plurality of sub-passwords in advance, the offer of purchase of goods or down-load can be executed without recording the master password itself, so that no attention need be paid to the storage of that master password.

Incidentally, the charging by the magnetic card 101 can be executed within the range of the maximum usable counts, the value of which is deleted if the deposit more than the price of purchase is always retained in the bank account of the user, so that the decision on the range of the maximum usable counts can be omitted.

Moreover, the sales database 107 stores only the first and last sub-passwords but may be store all the sub-passwords sent from the terminal system 102. By storing only the first and last sub-passwords, however, it is possible to save on the storage capacity of the sales database 107 and to reduce the data transfer rate in the network.

Incidentally, when only the first and last sub-passwords are stored, the number of intermediate sub-passwords can be determined by the number of computations till the first sub-password coincides with the last one, if the one-way function is recursively computed on the basis of the first sub-password.

Next, an example capable of making the data transfer rate on the network 103 lower than that of the example of FIG. 6 will be described with reference to FIGS. 7, 7A, and 7B.

First of all, the user inserts his magnetic card 101 into the terminal system 102 (at step 701).

Here, the information of FIG. 4 has already been stored in the magnetic card 101. The initialization of the information of FIG. 4 is executed at the card purchasing time. If this magnetic card is used for the first time, there is stored as the numerical value 403 of the past use counts a numerical value equal to the numerical value 404 of the maximum usable counts. On the other hand, the numerical value 403 is the data which is identical to the password 202 stored in the password information database 104.

Next, in the terminal system 102, the numerical value 403 of the past use counts and the numerical value 404 of the maximum usable counts are read out, and a numerical value smaller by the past use counts than the numerical value 404 of the maximum usable counts is calculated (at Step 702). This is the numerical value indicating the remainder of the usable counts of the magnetic card 101.

Next, in the terminal system 102, the master password 402 read out from the magnetic card 101 is initially inputted to compute the one-way function recursively only one time (at Step 703).

As a result, the terminal system 102 achieves one sub-passwords.

Next, the terminal system 102 reads out the price of the corresponding commodity from the goods database 106, determines the use counts of the card corresponding to the price, and confirms whether or not the determined number is equal to the number of sub-passwords calculated on the terminal system 102 by the one-way function (at Step 704).

If this answer is NO, the one-way function is computed only one time by using the sub-password obtained at Step 703 as the input information (at Step 705).

Next, the terminal system 102 increments the numerical value 403 of the past use counts of the card by "1" (at Step 706).

Next, the terminal system 102 confirms whether or not the numerical value 403 of the use counts is larger than the numerical value 404 of the maximum usable counts (at 707).

If the numerical value 403 of the past use counts exceeds, the card is decided to be already unusable, and the processing is interrupted.

Then, the operations of Steps 705 and 706 are recursively executed by using the sub-passwords attained at Step 705 as the input information.

If the number of sub-passwords calculated by the one-way function and the use counts of the magnetic card 101 corresponding to the price of the commodity are equal, all the sub-passwords, as obtained by the preceding operations (at Steps 703 to 705), are sent to the database management system 108 through the network 103 (at Step 708).

The database management system 108 fetches the sub-password, which is calculated first on the terminal system 102, from those received from the terminal system 102, and computes the one-way function recursively by using the fetched sub-password as the initial input (at Step 709).

Next, the database management system 108 confirms whether or not one-way functions identical to all the sub-passwords could be calculated in series by the recursive computations of Step 709. If there is an noncalculatable sub-password or if there are sub-passwords which fail to coincide even by the series computations, the processing is interrupted (at Step 710).

Specifically, when the one-way function in recursively computed by using the cub-password calculated first on the terminal system 102 as the initial input, there should be calculated a group of one-way functions which are identical to a group of one-way functions received from the terminal system 101. It is therefore confirmed whether or not those identical to all the sub-passwords received from the terminal system 101 could be calculated in series.

Next, if all the passwords could be calculated at Step 709, it is confirmed through the database management system 105 (at Step 711) that the same sub-passwords as that calculated first on the terminal system 102 are stored in the password information database 104.

If the same sub-passwords as the first one is stored on the database 104, the sub-password, as calculated last on the terminal system 102, is replaced by the sub-password information 202 on the database 104 (at Step 712).

Next, that sub-password is stored as the password 502 or 503 in the sales data base 107 (at Step 713).

In this case, the sub-password is stored as 502, if it is calculated first on the terminal system 102, and as 503 if calculated last.

Next, the database management system 108 sands the first and last sub-passwords of those received from the terminal system 102 to the database management system 105, and requests the bank online terminal system 109 or 110 to transfer the charge corresponding to the commodity price, after it has been confirmed that the two sub-passwords could be calculated by the one-way function from the master password information 302. As a result, the money corresponding to the commodity price is paid to the commodity supplier (at Step 714), thus ending the accountings.

Figure 6A:
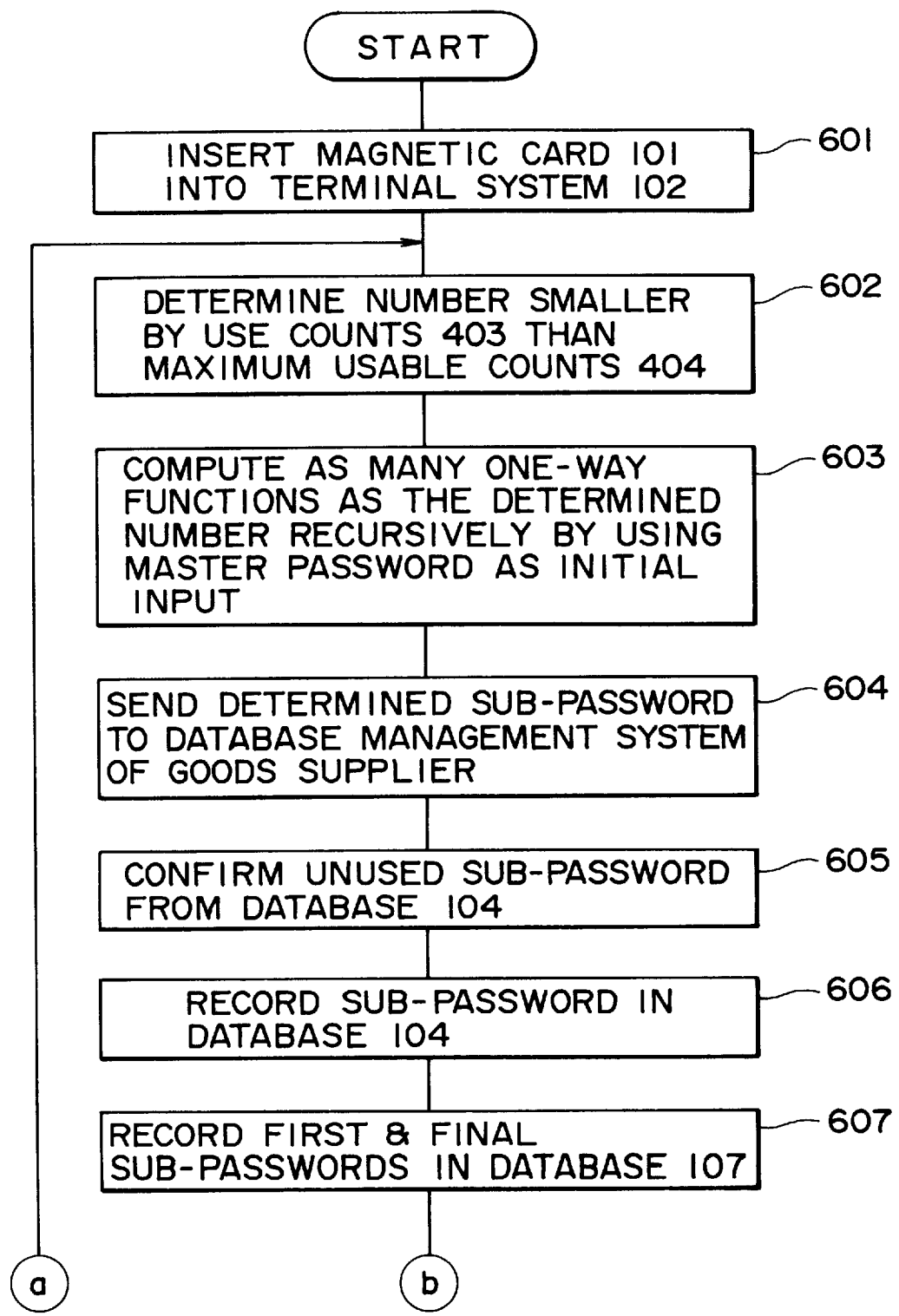
FIGS. 6A, and 6B are flow charts showing one example of an accounting procedure.
Figure 6B:
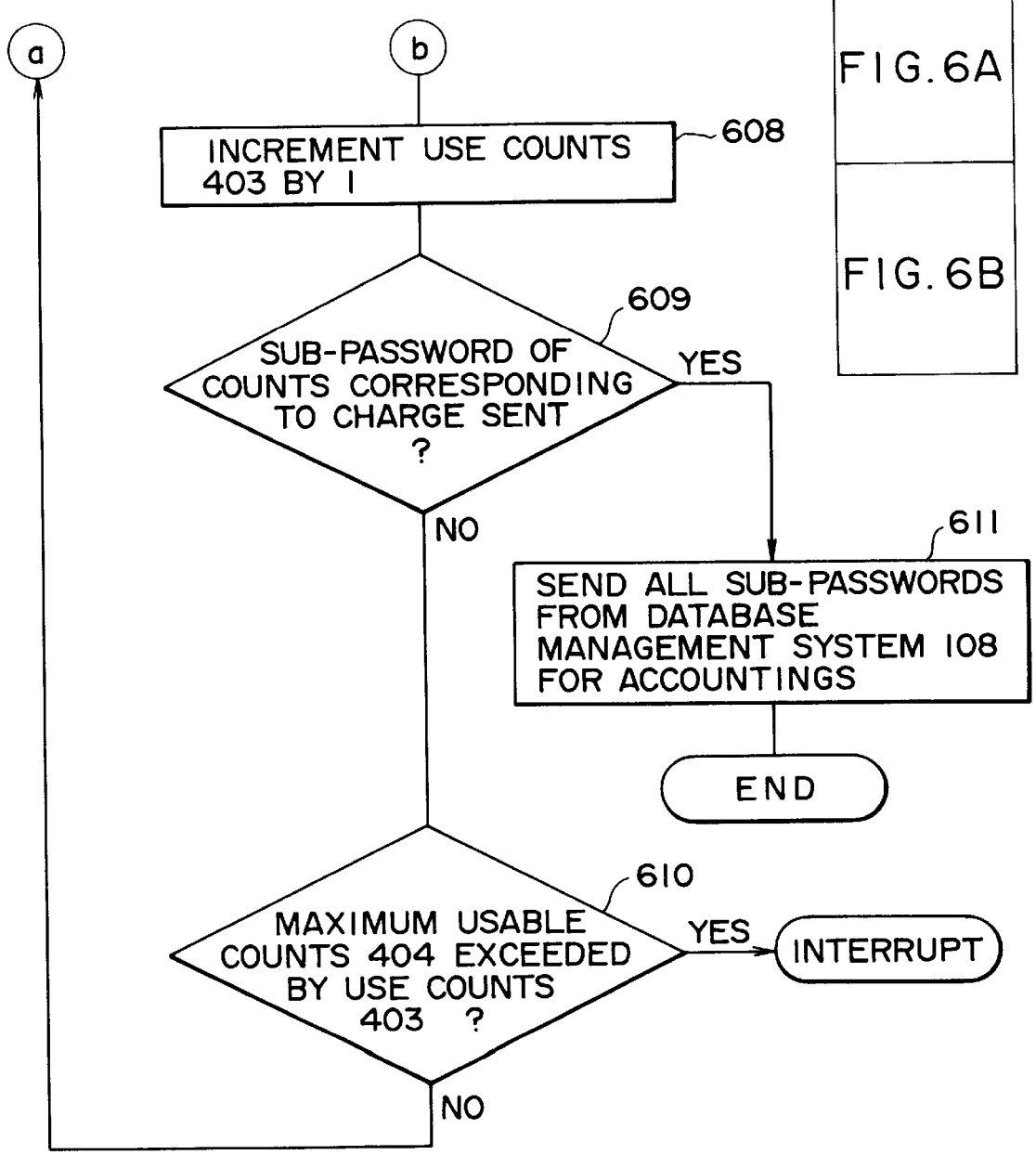
Figure 7A:
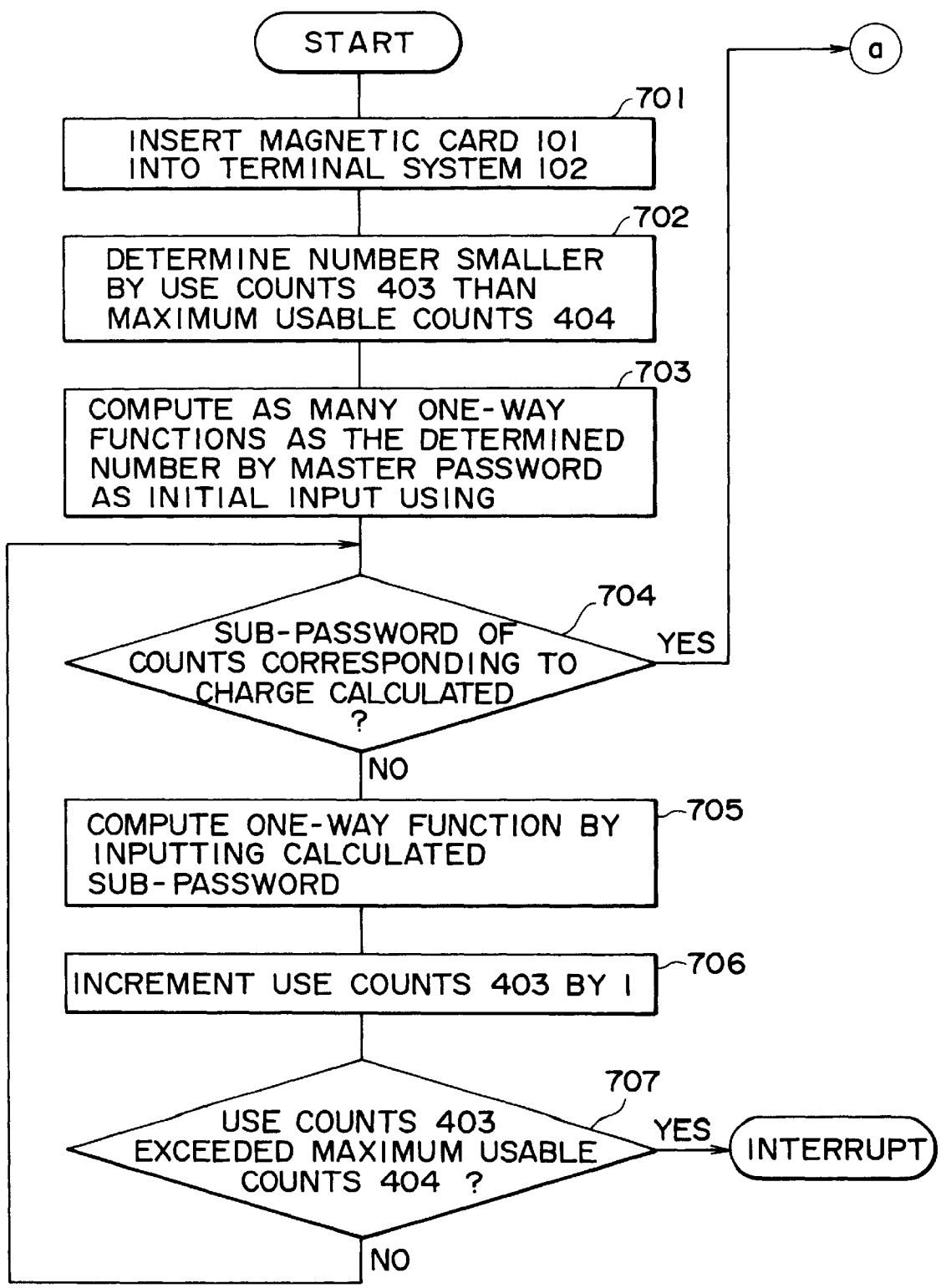

In the procedure of FIGS. 6, 6A, and 6B, the sub-passwords are calculated one by one and are sent at each calculation to confirm whether or not the sub-passwords are identical to the sub-password information 202 in the database 104. In the embodiment of FIGS. 7, 7A, and 7B, on the other hand, all the sub-passwords are sent altogether at Step 708, and the one-way function is recursively computed by using the sub-password, which is received first in the database management system 18, as the initial input. By this recursive computation, whether or not all the sub-passwords received from the terminal system 102 are unused passwords is confirmed depending upon whether or not the same sub-passwords as those received from the terminal system 102 could be calculated in series. As a result, the procedure of FIGS. 7, 7A, and 7B has such an advantage over the procedure of FIGS. 6, 6A, and 6B that the data transfer rate on the network 103 is further lowered.

Since the identical one-way functions (or sub-passwords) are not repeatedly used as those corresponding in number to the price to be sent from the user to the goods supplier, the user could not be illegally charged even if the content of communications between the user and the supplier could be tapped and copied.

Moreover, the sub-passwords to be sent from the user to the supplier contain neither the value of the sum of charges received in the past by the user nor the pest use counts of the specific passwords (or master passwords), the supplier cannot access the sum of the past charges upon the user. Moreover, the database is not recorded with the use counts of the master password of the user so that any third party cannot access the sum of the past charges on the user so long as the master password is not illegally copied.

Moreover, the user cannot calculate the unused sub-passwords by using any of the sub-passwords that were sent for any goods by the user, so that the supplier cannot change (or increase) the sum of the charges on the user, namely, make the unused sub-passwords into the used ones.

Since, moreover, the sub-password used by the user is recorded in the database, the sum of charges cannot be illegally changed (or decreased) by illegally using the once-used sub-password doubly.

By computing and recording a plurality of sub-passwords in advance, the offer of purchase of goods or down-load can be executed without recording the master password itself, so that no attention need be paid to the storage of that master password.

If one one-way function is used as the conversion unit, it can be easily handled by the user and the commodity supplier if it conforms to the currency unit of each country such as 1 ¥, 5 ¥ and 10 ¥ for Japan, 1 $, 10 $ and 100 $ for U.S.A., or its n-times (n: an integer$\leq$1). In this case, the user may be informed in advance by the commodity supplier, of what conversion unit is to be used.

Thus, according to the present invention, the charge system having a function to charge a user for the price of a commodity when the purchase of the commodity is offered or down-loading is made through a network can provide the following effects.

1) The user can be prevented from being illegally charged by a third party by tapping the content of communications between the user and the commodity supplier.
2) The supplier cannot access the sum of the past charges on the user.
3) The supplier cannot illegally forge (or increase) the sum of the charges on the user.
4) The user cannot illegally forge (or decrease) the sum of the charges.
5) Data corresponding to the secret key of the user can be easily stored.

What is claimed is:

1. A charge method for charging a user when the purchase of the commodity is offered or data is down-loaded through a network, comprising:
   (a) the step of reading a specific password from a recording medium carried by the user in a terminal system;
   (b) the step of generating one-way functions corresponding in number to the price with one one-way function as a conversion unit, on the basis of said password;
   (c) the step of sending and storing said one-way functions to and in a management system at the side of the commodity supplier, and then confirming the validity of said stored one-way functions by another management system at the supplier side or in the network; and
   (d) the step of executing, if the confirmation result of said step (c) is valid, the charge to the user for the sum corresponding to the number of said one-way functions.

2. A charge method for charging a user when the purchase of the commodity is offered or data is down-loaded through a network, comprising:

the step of arranging in the network:
   (a) a recording medium carried by the user and recorded with a specific password, the past use counts of said password and a password identifier;

(b) a terminal system for reading said specific password from said recording medium to calculate a one-way function thereof;

(c) a first database for storing the latest calculation result of the one-way function of said specific password for each password identifier; and (d) a second database for storing the one-way function, which is calculated and sent by said terminal system, for each password identifier;

(e) the step of reading, when the charge to the user for the price is to be executed, a specific password assigned inherently to the user, from the recording medium carried by the user;

(f) the step of: calculating the one-way function based on said specific password, after reading at the foregoing step, in said terminal system; comparing the calculated one-way function and the one-way function of the identical password identifier stored in said first database; confirming whether or not the one-way function calculated this time by said terminal system is unused; replacing, if unused, the one-way function of the identical password identifier, as stored in said first database, by the one-way function calculated this time by said terminal system; storing the one-way function, as calculated this time by said terminal system, in said second database; and updating the value of the use counts on said recording medium; and (g) the step of: repeating the decision of whether or not the one-way functions corresponding in number to said price with one one-way function as a conversion unit have been stored, and a plurality of recursive calculations of the one-way functions corresponding in number to said price, if not stored, on the basis of the preceding calculation result; storing the one-way functions corresponding in number to said price in said second database; and executing the charge to the user for the price which is equivalent to the number of the one-way functions stored in said second database.

3. A charge method for charging a user when the purchase of the commodity is offered or data is down-loaded through a network, according to claim 2, further comprising:

(a) the step of further storing the maximum usable counts of said specific password in said recording medium;

(b) the step of comparing the value of the past use counts and the maximum usable counts when the value of the past use counts on said recording medium is updated; and (c) the step of interrupting the processing if the former exceeds the later at said step (b).

4. A charge method for charging a user when the purchase of the commodity is offered or data is down-loaded through a network, according to claim 3, further comprising:

(a) the step of storing only the first one-way function and the last one-way function of those corresponding in number to said price, in said second database.

5. A charge method for charging a user when the purchase of the commodity is offered or data is down-loaded through a network, according to claim 2, further comprising:

(a) the step of storing only the first one-way function and the last one-way function of those corresponding in number to said price, in said second database.

6. A charge method for charging a user when the purchase of the commodity is offered or data is down-loaded through a network, comprising: the step of arranging in the network:

(a) a recording medium carried by the user and recorded with a specific password, the past use counts of said password and a password identifier;

(b) a terminal system for reading said specific password from said recording medium to calculate a one-way function thereof;

(c) a first database for storing the latest calculation result of the one-way function of said specific password for each password identifier; and (d) a second database for storing the one-way function, which is calculated and sent by said terminal system, for each password identifier;

(e) the step of reading out, when the charge to the user for the price is to be executed, a specific password assigned inherently to the user, from the recording medium carried by the user; and (f) the step of: calculating the one-way functions, as based on said specific password, altogether corresponding in number to said price with one one-way function as a conversion unit in said terminal system; storing a group of said calculated one-way functions in said second database; comparing the calculated one-way function, as generated first in the group of said one-way functions, with the one-way function of the identical password identifier stored in said first database; confirming whether or not the group of the one-way functions calculated this time by said terminal system are unused; replacing, if unused, the one-way function of the identical password identifier, as stored in said first database, by the first one-way function calculated this time by said terminal system; updating the value of the use counts on said recording medium, and executing the charge to the user for the price which is equivalent to the number of the one-way functions stored in said second database.

* * * * *